(12) United States Patent
McCarthy et al.

(10) Patent No.: US 6,965,621 B2
(45) Date of Patent: Nov. 15, 2005

(54) RING OPTICAL PARAMETRIC OSCILLATOR/OPTICAL PARAMETRIC AMPLIFIER COMBINATION IN SINGLE BEAMLINE

(75) Inventors: John C. McCarthy, Stratham, NH (US); Kevin J. Snell, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 61 days.

(21) Appl. No.: 10/695,511

(22) Filed: Oct. 28, 2003

(65) Prior Publication Data

US 2005/0213619 A1    Sep. 29, 2005

(51) Int. Cl.[7] ................................................ H01S 3/10
(52) U.S. Cl. ............................ 372/21; 372/22; 372/94; 359/330
(58) Field of Search .............................. 372/21, 22, 94; 359/330

(56) References Cited

U.S. PATENT DOCUMENTS

| | | | |
|---|---|---|---|
| 5,400,173 A * | 3/1995 | Komine | 359/330 |
| 6,456,424 B1 * | 9/2002 | Arbore et al. | 359/330 |
| 2002/0036820 A1 * | 3/2002 | Merriam et al. | 359/330 |
| 2002/0133146 A1 * | 9/2002 | Telfair | 606/5 |
| 2004/0012841 A1 * | 1/2004 | McCarthy | 359/330 |

* cited by examiner

*Primary Examiner*—Minsun Oh Harvey
*Assistant Examiner*—James Menefee
(74) *Attorney, Agent, or Firm*—Daniel J. Long; Robert K. Tendler

(57) ABSTRACT

By substituting a ring optical parametric oscillator for the linear cavity, one eliminates the effects of feedback solved in the prior art by the use of isolators and by the purposeful off-axis alignment of the pump laser beam. The result is an exceedingly robust system with state-of-the-art efficiency for maximizing output power while preserving beam quality.

10 Claims, 2 Drawing Sheets

RING OPTICAL PARAMETRIC OSCILLATOR/OPTICAL PARAMETRIC AMPLIFIER COMBINATION IN SINGLE BEAMLINE

FIELD OF THE INVENTION

This invention relates to optical range finders or LIDAR transmitters and more particularly to a method and apparatus for eliminating feedback into a pump laser.

BACKGROUND OF THE INVENTION

For militarized compact tactical laser systems, including laser target designators and range finders, one requires a relatively high output, for instance, 170 millijoules with a beam cross-section of five millimeters. The tactical laser system is to be provided in a package that is small, has a low parts count, and in which the optics, once mounted, are not required to be adjusted.

In order to provide such efficient laser transmitters, in the past it has been the practice to pump nonlinear optical crystals within a linear cavity which establishes an optical parametric oscillator (OPO), and to use the output of the optical parametric oscillator to pump an optical parametric amplifier (OPA). Typically for these applications, one requires an eye-safe laser, with the laser pump operating in the one-micron region, whereas the nonlinear optical crystals up-convert the pump to an idler of 1.5 microns for better eye-safe operation.

In the past there has been one particularly vexing problem and that is to reduce or eliminate feedback into the pump laser. Feedback disrupts the pump laser operation and requires the use of an optical isolator, which is both very heavy and relatively large. Importantly, radiation fed back to the pump laser heats up the pump laser which is very temperature-sensitive. For a typical optical parametric oscillator having opposed cavity mirrors, the feedback is generated because a portion of the light in the cavity is reflected back through the input mirror and directly into the pump laser. The result of feedback is that Q-switching is disrupted and Q switch pulse evolution is likewise affected. This causes many problems, including high-intensity spikes, erratic, unstable output levels and damage to optical components. As mentioned above, feedback also increases the temperature of the pump laser, which severely limits the temperature range for which one can use a linear cavity.

In order to diminish or eliminate feedback from the linear cavity, the input laser beam is intentionally aligned off-axis by a few milliradians so that feedback from the linear cavity is not injected back into the pump laser.

However, locating the pump laser slightly off-axis can to some extent cure this feedback problem. While providing stable operation over temperature, providing a pump beam which is misaligned with the optical axis of the linear cavity markedly reduces the performance of the laser system by, in effect, detuning the laser. Thus, for a two- to five-milliradian misalignment required to limit feedback into the pump cavity, the result is a reduction in output of approximately 15%.

Moreover, regardless of the above intentional misalignment, when linear optical parametric oscillator cavities are utilized, there is a requirement for an optical isolator which, as mentioned above, is very heavy and does not fit into the compact systems required for military applications. It will be appreciated that the isolator is located between the pump laser and the OPO. This isolator not only extends the length of the laser transmitter because it doubles the overall length, it also adds to the thickness of the package and can add inches to the thickness. In short, the use of an isolator increases the laser platform size by a factor of two.

The isolator also adds approximately five pounds to the weight of the laser. Presently, the laser with electronics and all associated components is only approximately 16 pounds. Thus, the addition of five pounds increases the overall weight of the system by one-third.

Doubling the size of the laser system is impermissible because of the pods that are utilized on aircraft, which by and large are of a fixed size. To be able to increase the pod size to accommodate linear OPOs requires aircraft redesign and acceptance of the increased weight due to the isolator required. Use of such devices has been discouraged due to the strict weight restrictions on all weapons packages for military aircraft.

Aside from the size and weight considerations mentioned above, it is important to understand that the LIDAR or laser range finder systems are subjected to severe mechanical vibration and G-loading, which can affect the alignment of the optical elements within the LIDAR. Noting that the pump laser beam misalignment is to be carefully controlled, alignment problems become paramount in military environments. One therefore seeks not to have a system requiring this misalignment that even further deleteriously affects the laser system. Note that it is only with difficulty that one can maintain a carefully-controlled misalignment in the face of vibration and temperature swings.

SUMMARY OF INVENTION

Rather than utilizing the combination of a linear optical parametric oscillator and an optical parametric amplifier, in the subject invention, a ring cavity is substituted for the linear OPO cavity. In one embodiment the mirrors that redirect the light around the ring are all located at 45° angles with respect to the beamline. In this embodiment, the pump laser is aligned along the optical centerline of one leg of the ring which serves as the single beamline for the system. The pumping laser pumps the ring OPO by injecting energy into nonlinear optical crystals such as KTP positioned along this beamline in this leg.

Because the input mirror for the ring is angled at 45° with respect to the beam from the pumping laser, all feedback energy is directed at 90° to the direction of the incoming pump beam. This means that the pump beam can be exactly aligned with the optical axis of the nonlinear optical crystals in the ring laser. The result is that, in one embodiment, for a five-millimeter beam, the output is 170 millijoules which is a result of taking the output of the optical parametric oscillator and passing it through additional nonlinear optical crystals, which form an optical parametric amplifier, and which lie along the same single beamline established by the pump laser. About half of the output power is due to the output of the ring laser, with the amplification providing a doubling of the OPO output power.

Importantly, the use of the ring laser as a substitute for the linear cavity, while permitting single beamline operation and minimizing alignment problems, also results in an extremely robust mechanical design for the optical bench in which no alignment adjustment is necessary once the mirrors are initially mounted. Since the four mirrors associated with the ring laser are fixedly attached to the optical bench, the original alignment is preserved and no critical off-axis alignment is required. One is therefore relying on mechanical tolerances of the cavity body making up the optical bench, which provides a very stable platform and stable operation of the laser range finder or LIDAR over a wide temperature range.

It will be appreciated that because of the 45° mirrors and the mechanical design of the cavity body, with the cavity body carved out of one piece of aluminum and the mirrors attached to the cavity walls, no adjustment is necessary.

Because of the on-axis single beamline configuration, the system operates at high efficiency over a wide range of temperatures, and vibration or shock environments.

In practice, the input mirror is a dichroic input mirror with coatings that permit injection of the laser pump radiation at 1064 nm. This coating also reflects the idler frequency of 1570 nm as well as at the residual pump frequency.

The output mirror is a dichroic mirror which is highly transmissive at the pump and idler frequencies and which is reflective for the signal.

Note that the input dichroic mirror is highly transmissive at the pump frequency and highly reflective at the signal frequency.

For those cavity mirrors which lie off of the single beamline to provide the ring cavity, these mirrors are highly reflective for the signal and highly transmissive for the idler frequencies.

In summary, substituting a ring optical parametric oscillator for the linear cavity, one eliminates the effects of feedback solved in the prior art by the use of isolators and by the purposeful off-axis alignment of the pump laser beam. The result is an exceedingly robust system with state-of-the-art efficiency for maximizing output power while preserving beam quality.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
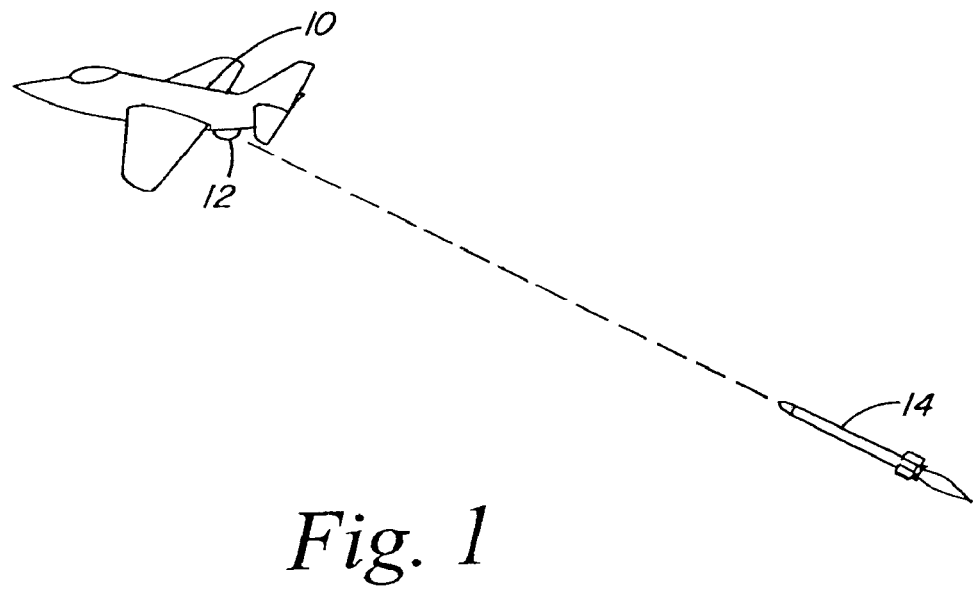
FIG. 1 is a diagrammatic illustration of the utilization of a LIDAR to establish the position of an incoming missile.

Referring now to FIG. 1, what is shown is a typical LIDAR or laser range finder scenario in which an aircraft 10 is provided with a pod 12 which houses the LIDAR or laser range finder unit. One of the purposes of such a unit is to illuminate the reticle of a missile 14 so as to receive return pulses so that the position of the missile can be ascertained. In order to do this, as much eye-safe laser energy as can be mustered is to be generated at pod 12 so as to robustly acquire an incoming missile.

In the past, in order to accomplish the irradiation of the seeker of the incoming missile, monochromatic radiation in the eye-safe region of the electromagnetic spectrum is used in a search pattern to detect the presence of, for instance, a shoulder-launched missile. In order to be able to discriminate against ground clutter, sand, rocks, terrain and the like, and in order to be able to quickly acquire a shoulder-launched missile, especially when it is in the ready position on the shoulder of an individual, it is important for signal-to-noise reasons that the amount of quality laser radiation be at as high a power as possible. While in the past it has been possible to illuminate such seekers or reticles with 120 millijoules of power utilizing a linear cavity approach, more power is in general required. Moreover, whatever is done to augment the laser power must fit into a pre-existing pod such as pod 12.

Figure 2:
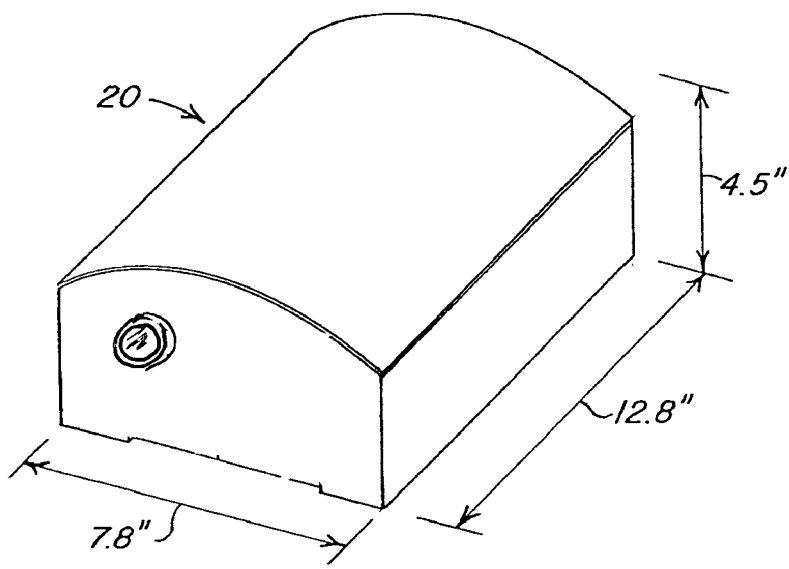
FIG. 2 is a diagrammatic illustration of the packaging utilized for carrying the LIDAR range finder of FIG. 1; and, FIG. 3 is a diagrammatic illustration of the single beamline ring OPO/OPA combination, which provides for an exceptionally highly efficient system.

Referring to FIG. 2, a LIDAR or laser range finder is mounted in the housing 20 which in one embodiment is to be no more than 12.8 inches long and 7.8 inches wide with a height of no more than 4.5 inches. It is this type of a package which will fit into pod 12 of FIG. 1. It is therefore incumbent upon those interested in increasing the laser output power to do so in a small package and to be able to increase efficiency over the linear cavity design so as to at least increase the power by the 15% lost by the aforementioned intentional misalignment of the pump laser.

Figure 3:
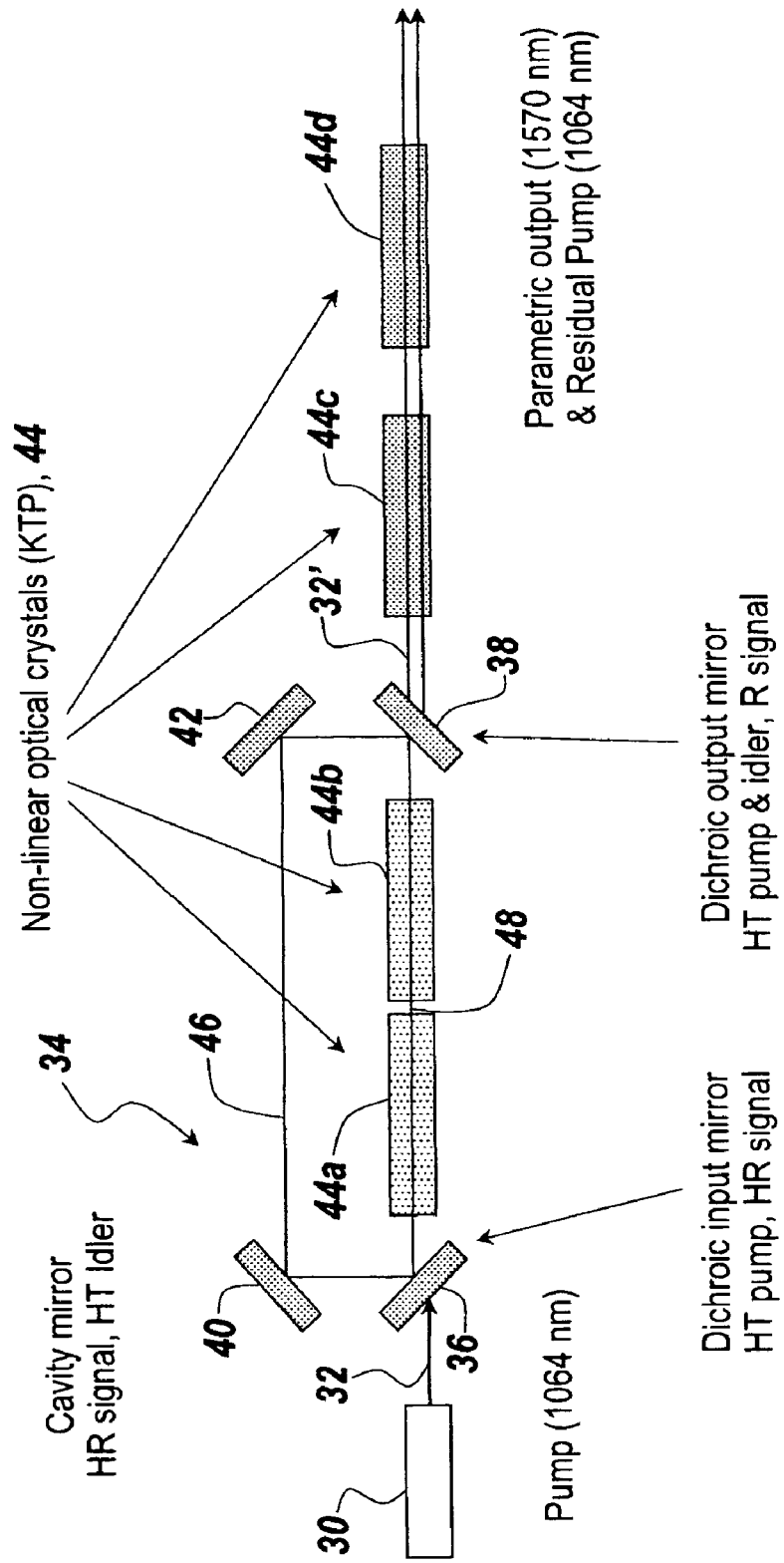

Referring now to FIG. 3, a pump laser 30 emits a beam 32 along a beamline established by the direction of this beam. Beam 32 is introduced into an optical parametric oscillator in the form of a ring cavity generally indicated at 34 to have an input mirror 36 and an output mirror 38. The ring laser is completed by mirrors 40 and 42, with nonlinear optical crystals 44 being laid out along the single beamline that is established by beam 32 from pump laser 30. In this case, two nonlinear optical crystals made of KTP and designated 44a and 44b are located between input mirror 36 and output mirror 38, with the input mirror being a dichroic mirror having high transmissivity at the pump wavelength of 1064 nanometers and high reflectivity at the signal wavelength which in this case is the parametric output at 1570 nanometers. Likewise, mirror 38 is a dichroic mirror having a high transmissivity at the pump and idler wavelengths and partial 40% reflectivity at the signal wavelength.

Light injected by pump laser 30 travels around the ring laser as indicated by line 46 which has a segment 48 aligned with pump laser beam 32. Crystals 44a and 44b are also aligned along this segment of the ring laser, with all of the mirrors being angled at 45° as illustrated.

The remainder of the cavity mirrors, namely cavity mirrors 40 and 42, are thin film, dichroically coated to be highly reflective at the signal wavelength and highly transmissive at the idler wavelength.

The output beam here illustrated at 32' is composed of the parametric oscillator output at 1570 nanometers and the residual pump at 1064 nanometers, with the output from the ring laser being injected into nonlinear optical crystals 44c and 44d.

It is the purpose of the optical parametric amplifier comprising crystals 44c and 44d to increase the output from mirror 38 by double, such that the output at 1570 nanometers in one embodiment is 170 millijoules with a beam cross-section of five millimeters. This doubles the 85 millijoule output of the ring laser.

What will be appreciated is that since the output of the pump laser defines the single beamline, the output of the optical parametric oscillator is at least 15% greater than the corresponding linear oscillator. Moreover, the amount of real estate occupied by the OPO/OPA combination is kept within the 12.8-inch requirement for a pod in one embodiment. It will be noted that there is no heavy and cumbersome isolator between the pump laser and the input mirror and as a result the optical system is five pounds lighter than would be the case for the linear cavity implementation.

Moreover, mirrors 36, 38, 40 and 42, once having been mounted in the hogged-out aluminum cavity forming the optical bench, are initially aligned by the fixing of the mirrors to the cavity. Thereafter, there is no requirement for additional adjustment of these mirrors, with the fixed mounting of these mirrors providing robust operation regardless of severe mechanical vibration or a high G-force environment.

While the subject system has been described in one embodiment as rejecting the signal, under certain circumstances and with appropriate coatings on the mirrors, the output can include not only the 1570 nm output but a component at 1.3 microns, a more eye-safe region of the electromagnetic spectrum. With appropriate mirror coatings the system can also operate in the eye-safe 3-micron band.

Regardless, the high energy output is in the eye-safe region of the electromagnetic spectrum, which makes the system usable where friendly forces are employed or in and about civilian communities. Also, a LIDAR or laser range finder of the subject configuration may be used for training purposes without concern as to the safety of those who may be illuminated by such a laser.

How the idler and signal outputs are generated in nonlinear optical crystals in an optical parametric oscillator are well known and are not described here.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus for increasing the output of a laser, comprising:
   a pump laser having an output beam defining a single beamline;
   an optical parametric oscillator in the form of a ring laser having a nonlinear optical crystal aligned along said single beamline; and,
   an optical parametric amplifier positioned to accept the output of said optical parametric oscillator and having a nonlinear optical crystal aligned along said single beamline.

2. The apparatus of claim 1, wherein said ring laser has a number of mirrors, each angled at 45° to said single beamline.

3. The apparatus of claim 2, wherein said mirrors include an input mirror to one side of the nonlinear optical crystal in said ring laser and an output mirror to the other side of said last-mentioned crystal.

4. The apparatus of claim 3, wherein said input and output mirrors are dichroic mirrors.

5. The apparatus of claim 4, wherein said input mirror is highly transmissive at the pump laser wavelength, wherein said ring laser develops a signal and wherein said input mirror is highly reflective at the signal wavelength.

6. The apparatus of claim 5, wherein said ring laser develops an idler and wherein said output mirror is highly transmissive at the pump and idler wavelengths and reflective at the signal wavelength.

7. The apparatus of claim 1, wherein said nonlinear optical crystals include KTP crystals.

8. The apparatus of claim 1, wherein the output from said optical parametric amplifier is in the eye-safe region of the electromagnetic spectrum.

9. The apparatus of claim 8, wherein said eye-safe region is in the 1.5-micron band.

10. The apparatus of claim 8, wherein said eye-safe region is in the 3-micron band.

* * * * *